Patented Oct. 27, 1953

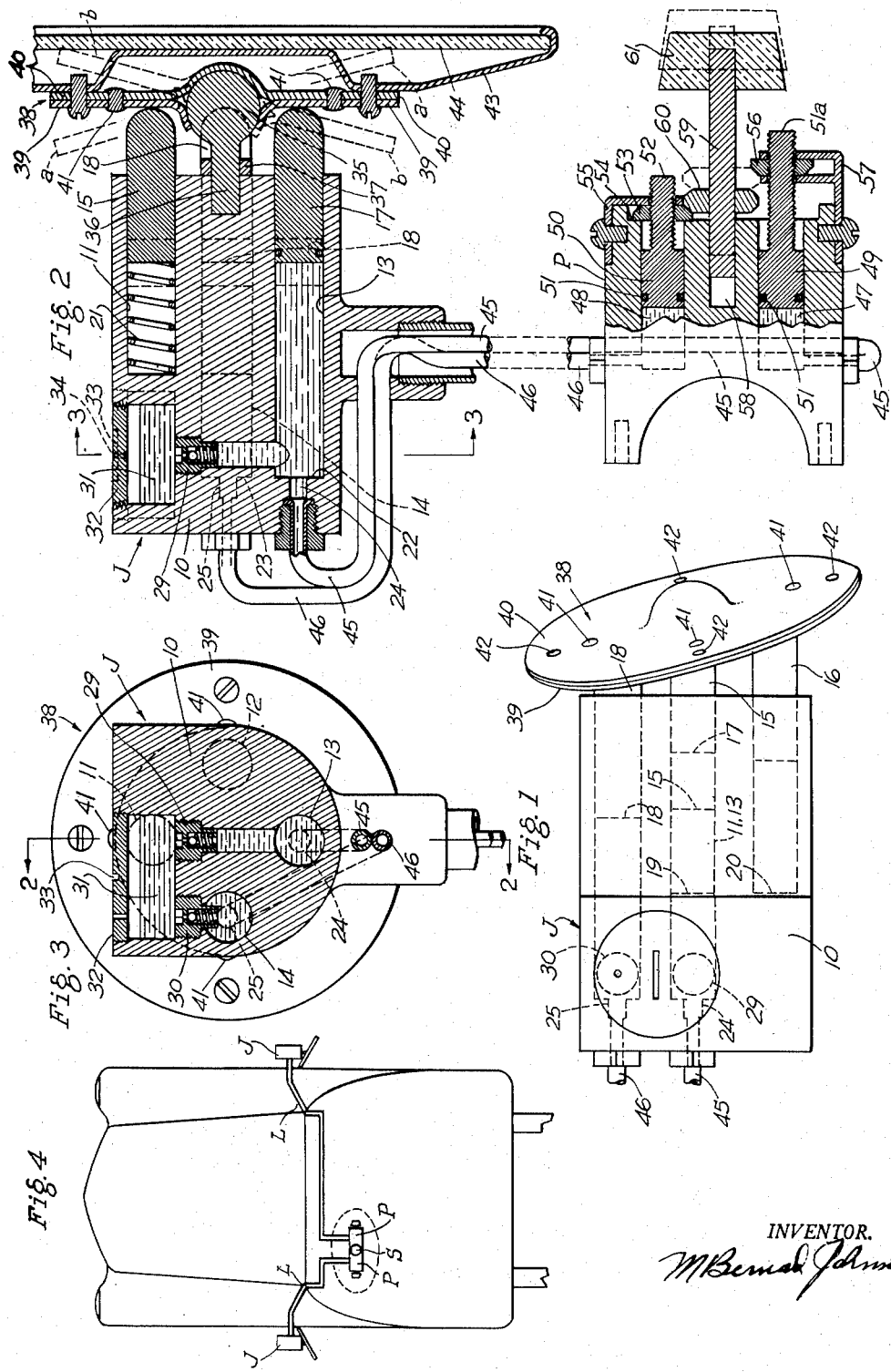

2,656,764

UNITED STATES PATENT OFFICE 2,656,764

MOUNT AND MEANS FOR SUPPORTING AND ORIENTING OPTICAL DEVICES

Marvin Bernard Johnson, Montgomery, Ala.

Application November 30, 1948, Serial No. 62,645

6 Claims. (Cl. 88—93)

The present invention relates to mounts which may be universally oriented within certain angular limits, and to means whereby the same may be remotely controlled; and, in particular, the invention relates to such mounts adapted to support various automotive accessory articles, such as rear-view mirrors, spot-lights, and reflectors; but it will be understood that the mount of the present invention and the means for selectively orienting the same may be used in various other applications where an article is required to be selectively oriented within a given angular field by remote control means, as, for example, a searchlight mounted on a tower and desired to be oriented from a station on the ground.

The general object of the present invention is to provide a mount which may be oriented universally within a given angular field, and remote control means whereby the same may be readily controlled.

A special object of the invention is to provide such a mount suited to supporting a rear-view mirror of an automotive vehicle, and means for controlling the same, said means being capable of installation proximate to the driver of the vehicle. This special object contemplates a novel, simple, inexpensive, and practical rear-view mirror mount and means for orienting the same from controls placed upon the steering column, the dashboard, or any other suitable place near the driver's hand.

A further object of the invention is to provide such a mount suited to supporting a spot-light of an automotive vehicle, and means for controlling the same, said means being situated, as above, proximate to the driver of the vehicle.

It will of course be understood from the following that the mount may be used, in connection with means for orienting the same situated proximate to the driver of a vehicle, for supporting any other accessory article of such a vehicle desired to be selectively oriented within a given angular field, as, for example, a reflector or flashing danger signal.

It will be understood from the following description, which is mainly restricted to the application of the mount and control means of the present invention as used in connection with controlling the orientation of a rear-view mirror of, say, a tractor hauling a trailer, where such mirror is inconveniently positioned with respect to the hand of the driver of the tractor and avoidance of manual adjustment of the mirror is desirable for reasons of driving safety, that the invention is adaptable to many other uses, some of which are subsequently suggested.

The invention essentially contemplates a mount which may be universally oriented within a given angular field and which, cooperating with means remotely positioned, may be controlled by said means.

In the drawing:

Fig. 1 is a top plan view of the mount itself, as designed with particular reference to a rear-view mirror of an automotive vehicle, and of proximately cooperating means for supporting and moving the same in a variety of angular positions relative to said means, the said means being strictly in top plan presentation and the said mount being, here, twisted on two axes.

Fig. 2 is a combinational view of the mount, proximately cooperating means for supporting and moving the same in a variety of angular positions relative to said means, remote means for controlling said first named means and therethrough said mount, and further means interconnecting the first named two means. The mount itself is, by means of a socket made part thereof, universally mounted on a ball-headed stud secured to a hydraulic jack; and both the jack and the mount are shown, here, in axial and elevational section; the remote means for controlling the first named means, i. e., the hydraulic jack, is, essentially, a pump, and is shown partly in axial section. Conduits for a hydraulic agent, such as oil, are shown, partly erased, connecting the pump with the jack. The pump is at the lower part of the figure and the jack and mount are above.

In Fig. 2, a rear-view mirror, partly erased at its upper portion, and in axial section, is also shown. Fig. 2 may be further identified as being a section on the plane indicated by 2—2, Fig. 3.

Fig. 3 is the section 3—3 of Fig. 2.

Fig. 4 is a schematic drawing of the front portion of a truck or tractor, in plan, showing the invention applied thereto for the purpose of facilitating the control, from the cab, of a pair of rear-view mirrors, one on each side of the vehicle.

The upper portion of Fig. 2 and Fig. 3 show, respectively, in axial and transverse vertical sections, a hydraulic jack, more particularly described below. Two similar jacks, indexed J, J, are schematically indicated in Fig. 4 on either side of a truck or tractor. The jack of Figs. 1, 2, and 3 is designated in its entirety as J.

The hydraulic jack is assumed to be mounted in any suitable manner outside the cab of a truck or tractor, and, preferably to be disposed so as to be axially parallel with the longitudinal axis of the vehicle. Thus, where the jack is to be employed in connection with a rear-view mirror, as shown in the drawing, that end of the jack to the left in Fig. 2 is assumed to be toward the forward end of the vehicle; and the mirror, as indicated in Fig. 2, is mounted on the jack to the right, or toward the rear of the truck.

The jack J comprises a block 10 which may be cylindrical, as shown, to the rear, and half-round below and squared above to the front (see Figs. 1, 2, and 3). The block 10 is bored from its rear end at 11, 12, 13, and 14 (see Fig. 3, particularly; compare Figs. 1 and 2) to provide cylinders for pistons 15, 16, 17, and 18. Each piston is squared at the inner or forward end, and formed hemispherically at its outer or rear end (see Fig. 2). The bores at 11, 12, 13, and 14 are spaced at 90° intervals.

The uppermost bore at 11 and that to the right side at 12 in Fig. 3 (not seen in Fig. 2) are bottomed at 19 and 20 respectively (see Fig. 1 with respect to index 20). Between the bottom of the bore at 11 and the forward end of the piston 15 is provided a compression spring 21 (see Fig. 2) which normally operates to urge the piston 15 outwardly with respect to the bore. Between the bottom of the bore at 12 and the forward end of the piston 16 is provided another compression spring similar to spring 21 and which normally operates to urge the piston 16 outwardly with respect to the bore at 12.

The lowermost bore at 13 and that to the left side at 14 in Fig. 3 (dotted in Fig. 2) are bottomed at 22 and 23 respectively (see Figs. 1 and 2), and counterbored through to the forward end of the block 10 to form ports 24 and 25. Pistons 17 and 18 are provided with packing rings within their respective cylinders. See Fig. 2, wherein a packing ring 26 is shown mounted in an annular groove 27 in piston 17. Here piston 18 is seen only as a dotted outline.

That part of the bores at 13 and 14 forward of the pistons 17 and 18 respectively is filled without oil or other suitable hydraulic agent 28, which is supplied either through ports 24 and 25, or through valves at 29 and 30 communicating with a reservoir 31 bored into the top forward and squared portion of the block 10 (see Figs. 1, 2, and 3). The reservoir 31 is covered by a cap 32 having a screwdriver slot 33 in the center thereof and a breathing hole 34.

Universally mounted on the ball end 35 of a stud 36 screwed into the rear end, and center, of block 10, and locked therein by a nut 37, is a socketed mount 38, formed of two formed plate portions 39 and 40, riveted together as at 41, 41, 41 (see Figs. 1, 2 and 3), and provided with screw holes 42, 42, 42, 42, to facilitate the attachment thereto of a rear-view mirror back 43, the mirror of which, shown in Fig. 2 only, is designated 44.

In Fig. 2, as well as in Fig. 3, the mount 38 is shown in solid lines to be positioned normally with respect to the axis of the block 10. In Fig. 2, dotted outlines a and b indicate abnormal positions of the mount with respect to said axis. In Fig. 1 the mount, shown without the mirror attached thereto, is seen to be twisted with respect to said axis.

Through ports 24 and 25 the bores 13 and 14 are supplied with oil under variable pressure by means of two conduits 45 and 46 of suitable length (shown interrupted by dotted lines in Fig. 2) connecting the jack J with a suitable pump P preferably located on the steering column of the vehicle, but, of course, locatable at any convenient place within the cab.

The conduits 45 and 46 communicate respectively with cylinders 47 and 48 within the pump P which are provided with pump pistons 49 and 50, each of which is surrounded by a packing ring 51. The pistons 49 and 50 are continued outwardly with respect to the cylinders to which they relate by threaded extensions 51a and 52 respectively. Extension 52 is engaged by a bevel gear 53, prevented from moving axially by a shoulder 54 and a bracket 55; and extension 51a is engaged by a bevel gear 56, prevented from moving axially by a double bracket 57. Between the two cylinders 47 and 48 and parallel to them is a bore 58 slidably containing the end of a rod 59 on which is fixed a double bevel gear 60 adapted to engage bevel gear 53 when the rod is positioned as shown in solid lines in Fig. 2 and to engage bevel gear 56 when the rod is positioned as indicated in dotted lines in the same figure. The outer end of the rod 59 is provided with a knob 61 by means of which the rod may be both rotated and moved axially. It will be plain that when the double bevel gear 60 engages bevel gear 53 and is rotated in one direction the oil in cylinder 47 is discharged through conduit 45 into the bore at 13 in the hydraulic jack J thereby forcing piston 17 rearwardly; and that when the double bevel gear, so engaging bevel gear 53, is rotated in the opposite direction, relieving pressure against the oil in the system, the compression spring 21 forces piston 15 against the mount and the latter, by toggling on the ball and socket connection, forces piston 17 inwardly and in consequence forces oil in the system into cylinder 47. Likewise it will be plain that when the double bevel gear 60 engages bevel gear 56 and is rotated in one direction the oil in cylinder 48 is discharged through conduit 46 into the bore at 14 in the hydraulic jack J thereby forcing piston 18 rearwardly; and that when the double bevel gear, so engaging bevel gear 56, is rotated in the opposite direction, relieving pressure against the oil in the system, the compression spring within the bore at 12 forces piston 16 against the mount and the latter, by toggling on the ball and socket connection, forces piston 18 inwardly and in consequence forces oil in the system into cylinder 48.

In Fig. 4, which is a schematic plan view of the forward part of a truck or tractor having a rear-view mirror mounted, according to the invention, on either side, two sets of oil lines are indicated as L, L, communicating between jacks J, J, and pumps P, P. The steering column is indexed S.

From the foregoing it will be obvious that the system described may be employed for a spotlight, reflector, danger signal, or another automotive accessory; and might well be utilized in many applications not associated with automotive vehicles. It is to be understood that nothing herein is intended to limit the invention to its applicability to supporting and selectively orienting automotive accessories.

It will also be understood that the invention contemplates mechanical equivalents such as the use of two oil lines rather than the combination of a single oil line offset mechanically by a compression spring.

I claim:

1. The combination of a socketed mount for supporting an optical device, a housing, a ball headed stud mounted centrally of said housing, said socketed mount being swivelly supported on the ball head of said stud, a pair of pistons carried by said housing and engaging the rear of the socketed mount on opposite sides of its swivel support, a spring urging one of said pistons toward said mount, hydraulic means urging said other piston toward said mount, and a pump for supplying hydraulic pressure to said hydraulic means.

2. The combination of claim 1, including a mirror supported on said mount, said mount being carried outside the cab of a motor vehicle, and said pump being mounted within said cab, whereby said mirror may be oriented from within said cab.

3. The combination of a socketed mount for supporting an optical device, a housing, a ball headed stud mounted centrally of the housing, said socketed mount being swivelly supported on the ball head of said stud, four parallel cylinders mounted on said housing and arranged at 90° stations of position around the stud as a common center, a piston slidably carried in each cylinder, and means in each cylinder for urging the pistons against the mount.

4. The combination of a socketed mount for supporting an optical device, a housing, a ball headed stud mounted centrally of the housing, said socketed mount being swivelly supported on the ball head of said stud, four parallel cylinders mounted on said housing and arranged at 90° stations of position around the stud as a common center, a piston slidably carried in each cylinder, a compression spring within two of said cylinders spaced 90° apart for urging the pistons outwardly, hydraulic means within the other two cylinders, said pistons engaging the back of said socketed mount, and a pump arranged to supply hydraulic fluid to the latter two cylinders.

5. The combination recited in claim 4, said pump arranged to selectively supply fluid to each of the latter two cylinders to cause said mount to swivel on the ball head of the stud.

6. The combination recited in claim 5, including a mirror supported on said mount, said mount and said cylinders being carried on the outside of the cab of a vehicle, and said pump being mounted within the cab whereby said mirror may be oriented from within the cab.

M. BERNARD JOHNSON.

References Cited in the file of this patent

UNITED STATES PATENTS

| Number | Name | Date |
|---|---|---|
| 1,433,504 | Grigsby | Oct. 24, 1922 |
| 1,913,874 | Folberth et al. | June 13, 1933 |
| 1,987,733 | Fonbrune | Jan. 15, 1935 |
| 2,198,965 | Habig et al. | Apr. 30, 1940 |
| 2,260,597 | Beattie | Oct. 28, 1941 |
| 2,297,610 | De Giers | Sept. 29, 1942 |
| 2,326,316 | Allen | Aug. 10, 1943 |
| 2,330,444 | Park | Sept. 28, 1943 |
| 2,341,208 | Clark | Feb. 8, 1944 |
| 2,373,745 | Conway | Apr. 17, 1945 |
| 2,457,348 | Chambers | Dec. 28, 1948 |